United States Patent
Mason et al.

(10) Patent No.: US 10,911,273 B2
(45) Date of Patent: *Feb. 2, 2021

(54) VEHICLE COMMUNICATION SYSTEM USING INCOMPATIBLE MODULATION TECHNIQUES

(71) Applicant: Transportation IP Holdings, LLC, Norwalk, CT (US)

(72) Inventors: Gary William Mason, Melbourne, FL (US); Maurice Hutchins, Melbourne, FL (US); Robert Palanti, Melbourne, FL (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,711

(22) Filed: Mar. 11, 2020

(65) Prior Publication Data

US 2020/0213169 A1 Jul. 2, 2020

Related U.S. Application Data

(63) Continuation of application No. 16/184,804, filed on Nov. 8, 2018, now Pat. No. 10,623,216.

(51) Int. Cl.
*H04B 7/26* (2006.01)
*H04L 27/32* (2006.01)
*H04L 27/00* (2006.01)
*H04L 27/12* (2006.01)
*B61L 3/00* (2006.01)
(Continued)

(52) U.S. Cl.
CPC .......... *H04L 27/0008* (2013.01); *B61L 3/008* (2013.01); *B61L 15/0036* (2013.01); *H04L 27/12* (2013.01); *H04L 27/2035* (2013.01)

(58) Field of Classification Search
CPC ......... H04L 27/00; H04L 27/12; H04L 27/20; H04L 27/10; H04L 27/18; H04L 27/32; H04B 7/26; H04B 3/36
See application file for complete search history.

(56) References Cited

U.S. PATENT DOCUMENTS 7,395,141 B1 * 7/2008 Seck ................. B61C 17/12
246/182 R
8,310,979 B2 * 11/2012 Mason ............... B61L 15/0027
370/315

(Continued)

*Primary Examiner* — Blane J Jackson
(74) *Attorney, Agent, or Firm* — Christopher R. Carroll; The Small Patent Law Group LLC (57) ABSTRACT

A vehicle communication system includes a lead communication device wirelessly communicating command messages to remote communication devices onboard a vehicle system during a messaging cycle. The lead device receives reply messages from the remote devices during the messaging cycle in response to the command messages. The lead device receives a status signal from at least one of the remote devices during a guard interval that follows completion of the messaging cycle. The lead device communicates the command message and receives the reply messages using analog modulation or digital modulation. The lead communication device also receives the status signal using the other of the analog modulation or the digital modulation. The command messages, the reply messages, and the status signal are communicated using a designated frequency channel.

20 Claims, 6 Drawing Sheets

(51) Int. Cl.
*B61L 15/00* (2006.01)
*H04L 27/20* (2006.01)

(56) References Cited

U.S. PATENT DOCUMENTS

| | | | |
|---|---|---|---|
| 8,914,167 B2* | 12/2014 | Smith | B61L 15/0027 701/19 |
| 2004/0120305 A1* | 6/2004 | Aiken, II | B61L 3/127 370/347 |
| 2010/0130124 A1* | 5/2010 | Teeter | B61L 15/0027 455/15 |
| 2011/0183605 A1* | 7/2011 | Smith, Jr. | H04L 1/1867 455/7 |
| 2015/0229502 A1* | 8/2015 | Vilaipornsawai | H04L 27/2607 375/295 |
| 2016/0016596 A1* | 1/2016 | Naylor | B61L 15/0018 709/220 |
| 2018/0049067 A1* | 2/2018 | He | H04L 5/0066 |
| 2018/0062902 A1* | 3/2018 | Gagiev | H04L 23/00 |

* cited by examiner

VEHICLE COMMUNICATION SYSTEM USING INCOMPATIBLE MODULATION TECHNIQUES

CROSS-REFERENCE TO RELATED APPLICATIONS

This application is a continuation of U.S. patent Ser. No. 16/184,804, filed 8 Nov. 2018 (the "'804 application"), the entire disclosure of which is incorporated herein by reference.

FIELD

The subject matter described herein relates to locomotive communication systems.

BACKGROUND

Vehicle systems can have multiple propulsion-generating vehicles that include communication devices for the vehicles to communicate with each other. The vehicles can communicate with each other to coordinate individual vehicle movements so that the entire vehicle system moves along routes. For example, locomotives can communicate with each other using wireless communications so that one locomotive can remotely direct the throttle settings, brake settings, etc., of the other locomotives in the same rail vehicle system.

The locomotives may send messages (also referred to as signals) back-and-forth to ensure that messages commanding changes in throttle settings and/or brake settings are sent and that messages indicating the changes were received are sent. These vehicle systems typically employ a contention scheme to prevent overlapping interference between the different messages. For example, some locomotives use a slotted aloha protocol to allow multiple trains containing multiple locomotives to use the same frequency channel for communicating messages between the locomotives in the same train. This protocol divides the times at which different locomotives can communicate over the channel into time slots that are accessed on a prioritized but randomized basis.

Once a lead locomotive from one train seizes the channel, that lead locomotive and the remote locomotives that are controlled by that lead locomotive have exclusivity of the channel for a defined period of time. This channel exclusivity allows for data communication between the lead locomotive and the remote locomotives to occur without interference from communication between other locomotives using the same channel.

This scheme relies on all locomotives within radio range to receive a radio protocol preamble from other transmitters on the channel to force the locomotives to hold off channel access for a preset period of time. In the current implementation, this occurs using Frequency Shift Keying (FSK) modulation. Other modulation schemes cannot be used at the same time on the same channel due to the incompatibility of the modulation schemes. For example, these locomotives or other devices cannot use Shaped Offset Quadrature Phase Shift Keying (SOQPSK) on the same channel and at the same time as the two modulation methods are mutually incompatible and neither modulation method would hold off transmitting for the other method.

BRIEF DESCRIPTION

In one embodiment, a locomotive communication system includes a lead communication device configured to wirelessly communicate a command message to one or more remote communication devices onboard a rail vehicle system during a messaging cycle. The lead communication device is configured to receive one or more reply messages from the one or more remote communication devices during the messaging cycle in response to communicating the command message. The lead communication device also is configured to receive a status signal from at least one of the remote communication devices during a guard interval that follows completion of the messaging cycle. The lead communication device is configured to communicate the command message and receive the one or more reply messages using a first modulation comprising one of analog modulation or digital modulation. The lead communication device also is configured to receive the status signal using a different, second modulation comprising the other of the analog modulation or the digital modulation. The lead communication device also is configured to communicate the command message and receive the one or more reply messages and the status signal using a designated frequency channel.

In one embodiment, a method includes wirelessly communicating a command message from a lead communication device to one or more remote communication devices onboard a rail vehicle system during a messaging cycle, wirelessly receiving one or more reply messages from the one or more remote communication devices during the messaging cycle in response to communicating the command message, and wirelessly receiving a status signal from at least one of the remote communication devices during a guard interval that follows completion of the messaging cycle. The command message and the reply message are communicated using a first modulation comprising one of analog modulation or digital modulation. The status signal is received using a different, second modulation comprising the other of the analog modulation or the digital modulation. The command message, the reply message, and the status signal are communicated using a designated frequency channel.

In one embodiment, a locomotive communication system includes a lead communication device configured to be disposed onboard a lead locomotive of a rail vehicle system. The lead communication device is configured to communicate with one or more remote communication devices according to a defined messaging cycle to control movement of the rail vehicle system. The one or more remote communication devices are disposed onboard one or more remote locomotives in the rail vehicle system. The messaging cycle includes a first time slot for the lead communication device to send a command signal to the one or more remote communication devices using a first modulation scheme on a single frequency channel and one or more subsequent second time slots for the one or more remote communication devices to send a reply signal to the lead communication device using the first modulation scheme on the single frequency channel. The lead communication device is configured to receive a status signal from at least one of the remote communication devices using a second modulation scheme on the single frequency channel. The first modulation scheme and the second modulation scheme are incompatible with each other.

In an embodiment, a system includes a lead communication device configured to be disposed onboard a vehicle system. The lead communication device is configured to wirelessly communicate a command message to one or more remote communication devices onboard the vehicle system during a messaging cycle. The lead communication device is configured to wirelessly receive one or more reply messages from the one or more remote communication devices during the messaging cycle in response to communicating the command message. The lead communication device is configured to wirelessly receive a status signal from at least one of the remote communication devices during a guard interval that follows completion of the messaging cycle. The command message and the reply message are communicated using a first modulation comprising one of analog modulation or digital modulation. The status signal is received using a different, second modulation comprising the other of the analog modulation or the digital modulation. The command message, the reply message, and the status signal are communicated using a designated frequency channel.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein include communication systems that provide for the use of incompatible modulation schemes to be used to communicate on the same channel by the same devices. The incompatible modulation schemes can be different types of data modulation that cannot be used at the same time on the same frequency due to the types of data modulation interfering with each other. As one example, one modulation scheme can be an analog modulation scheme while another modulation scheme can be a digital modulation scheme. In one embodiment, one of the modulation schemes is Frequency Shift Key (FSK) modulation and the incompatible modulation scheme is Shaped Offset Quadrature Phase Shift Keying (SOQPSK) modulation. Alternatively, other incompatible modulation schemes may be used. For example, minimum shift keying (MSK) modulation and SOQPSK modulation could be used, binary phase shift key (BPSK) modulation and quadrature phase shift key (QPSK) modulation could be used, amplitude shift key (ASK) modulation and quadrature phase shift key (PSK) modulation could be used, continuous phase frequency shift key (CPFSK) modulation and QPSK modulation could be used, quadrature amplitude modulation (QAM) and Gaussian minimum shift key (GMSK) modulation could be used, or the like.

Under other circumstances where the inventive subject matter described herein is not used, the mixing of the incompatible modulation methods within the same channel and within the same geographical area would not be possible due to inherent incompatibilities and the eventual message collisions that would occur. For example, the concurrent or simultaneous communication of messages formed using the incompatible modulation schemes using the same frequency and within close enough proximity to each other (that the messages interfere with each other) may not be currently possible. One or more embodiments of the inventive subject matter described herein utilize a guard interval that is present between vehicle message transmissions to provide non-conflicting transmission time and bandwidth using a legacy (e.g., existing) communication system to exploit the benefits of one modulation scheme over the other (e.g., the higher data speeds available with SOQPSK modulation). Additional channel bandwidth can be achieved without adding additional channelization or sacrificing performance of the legacy system.

Some communication systems use timing protocols to allow multiple communication devices to communicate with each other using the same channel (e.g., the same frequency). For example, the current LOCOTROL system by which rail vehicles (e.g., locomotives) in the same rail vehicle system (e.g., train or consist) communicate with each other uses a modified Slotted Aloha protocol to allow multiple different trains containing multiple locomotives to use the same channel. The vehicle that commands other vehicles in the same vehicle system can be referred to as the lead vehicle or lead locomotive, while the vehicles that are commanded by the lead vehicle can be referred to as the remote vehicles or remote locomotives. The communication scheme divides the channel time into time slots that are accessed on a prioritized but randomized basis. Once a particular lead vehicle from a particular vehicle system (e.g., train) seizes a channel for communication, that lead vehicle and the remote vehicles in the same vehicle system have exclusivity of the channel for a finite period of time, thus allowing data communications between the lead vehicle and all remote vehicles to occur without interference (e.g., from other lead vehicles or remote vehicles in other vehicle systems).

The communication scheme also relies on the vehicle communication devices that are within radio range of each other to receive a radio message protocol preamble (referred to herein as Barker 1 and Barker 2) from other communication devices that are sending messages on the channel to force the receiving communication devices to hold off on accessing the channel for a preset period of time. This can occur using one type of modulation scheme (e.g., FSK modulation). But, this also prevents the simple addition of more communication devices to the vehicle system that operate with a different modulation scheme (e.g., SOQPSK modulation) as the modulation schemes are mutually incompatible and neither modulation method would hold off transmitting messages to allow the other modulation method to send messages. That is, a device using FSK modulation would not receive and understand that a SOQPSK-modulated message indicates that another device is using the channel at that time. Instead, the device using FSK modulation would continue communicating messages that interfere with and prevent successful communication of the SOQPSK-modulated messages.

In one embodiment of the inventive subject matter described herein, a communication system uses a guard interval that is built into the communication scheme or schedule of one modulation technique. In at least one contention scheme, after the last vehicle within a vehicle system has completed the last message transmission of the last vehicle, a minimum guard interval is required by the contention scheme of the communication system before any other vehicle may access the channel. For example, the last remote locomotive in a train to send a reply or status message to the lead locomotive in the train may be required by the contention scheme to wait for a designated period of guard time (also referred to as a guard interval) before any other lead locomotive can communicate on the same channel. During this guard interval, the communication systems and methods described herein can use another modulation scheme, such as the SOQPSK modulation scheme, for communication of additional messages, thereby permitting additional data and/or control messages to be exchanged within a vehicle system.

While the description herein focuses on rail vehicles such as locomotives and vehicle systems such as trains and rail consists, not all embodiments of the inventive subject matter are limited to rail vehicles. For example, the inventive subject matter can be used in connection with other vehicles (e.g., automobiles, mining vehicles, off-highway vehicles, marine vessels, etc.) and/or other communication devices (e.g., communication devices that are not onboard vehicles). With respect to vehicle systems, not all embodiments are restricted to vehicle systems formed from mechanically coupled vehicles. For example, some embodiments of the inventive subject matter can be used with rail vehicles that are mechanically connected with each other by couplers in a train or rail vehicle consist. Other embodiments of the inventive subject matter can be used with vehicles that are logically connected but not necessarily mechanically connected with each other. Vehicles can be logically connected with each other in a vehicle system when the vehicles communicate with each other to coordinate movements of the vehicles with each other so that the vehicles travel together along routes as a vehicle system.

Figure 1:
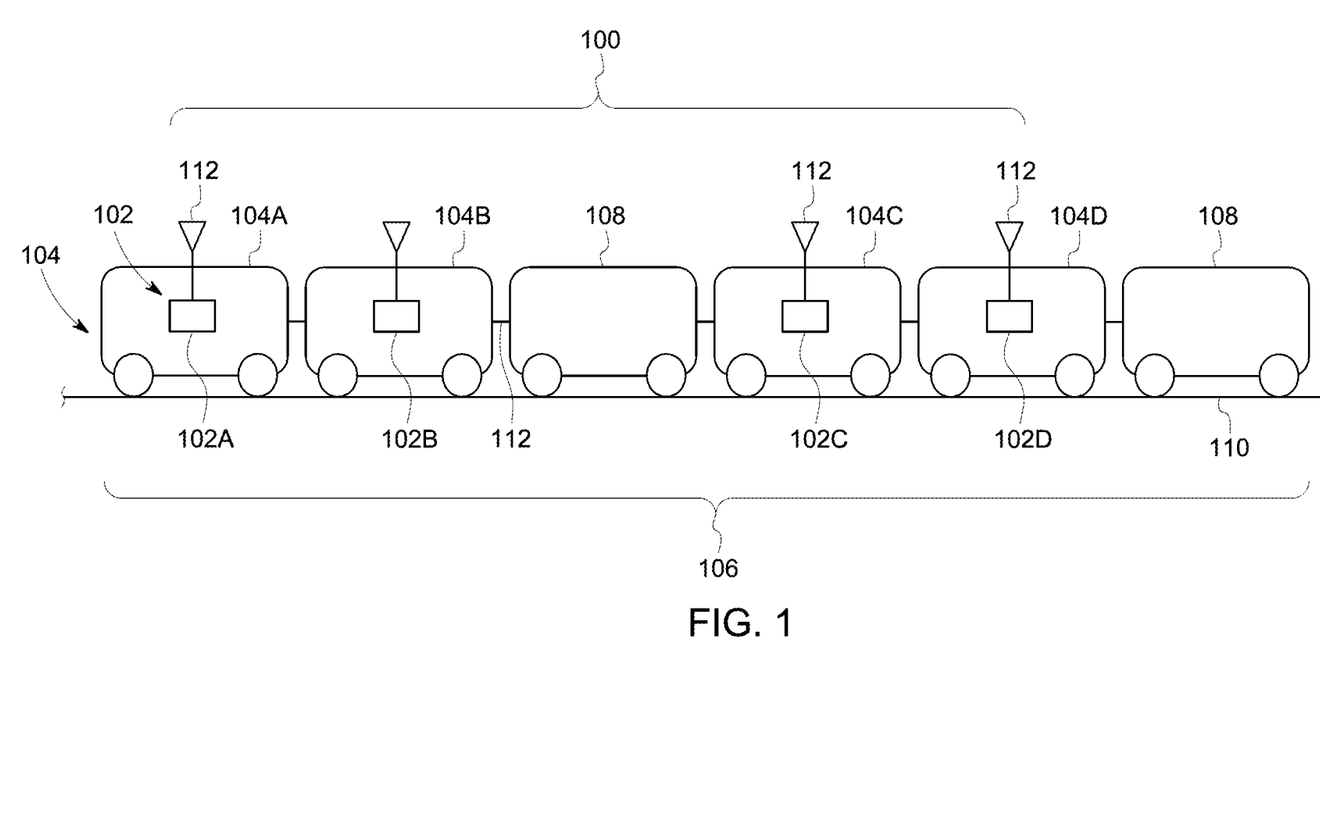
FIG. 1 illustrates one example of a communication system.

FIG. 1 illustrates one example of a communication system 100. The communication system 100 includes communication devices 102 (e.g., devices 102A-D) disposed onboard different vehicles 104 (e.g., vehicles 104A-D) in a vehicle system 106 formed from the vehicles 104 and additional vehicles 108. The vehicle system 106 can be a rail vehicle system with the vehicles 104 being locomotives and the vehicles 108 being cargo cars, rail cars, passenger cars, or the like. Alternatively, the vehicle system 106 can be a non-rail vehicle system formed from propulsion-generating vehicles 104 and non-propulsion-generating vehicles 108. The vehicles 104, 108 may be mechanically coupled with each other in the vehicle system 106 directly or indirectly (e.g., by at least one additional vehicle 104, 108). The vehicles 104, 108 can be mechanically connected with each other by couplers 112. Alternatively, the vehicles 104 and/or 108 may not be mechanically coupled with each other but may be logically coupled with each other without mechanical couplings. The vehicles 104, 108 can travel together in the vehicle system 106 along one or more routes 110.

The communication devices 102 represent hardware circuitry that includes and/or is connected with one or more processors (e.g., one or more microprocessors, one or more field programmable gate arrays, one or more integrated circuits, and/or the like) that perform the operations described herein in connection with the communication devices 102. The communication devices 102 can include or represent transceiving circuitry such as modems, routers, antennas 120, switches, and the like. The communication devices 102 can run one or more software applications that direct the operations of the processors and/or transceiving circuitry. The communication devices 102 send and/or receive data signals or messages between the communication devices 102. One or more other pieces of equipment onboard the vehicles 104 can communicate data with each other via the communication devices 102, as described herein.

The communication devices 102 wirelessly communicate with each other to coordinate operations of the vehicles 104 with each other. In one embodiment, one of the communication devices 102A is a lead communication device onboard a lead vehicle 104A. The remaining communication devices 102B-D may be remote communication devices onboard corresponding remote vehicles 104B-D. The lead vehicle 104A can remotely control movements of the remote vehicles 104B-D by wirelessly sending messages to the remote communication devices 102B-D of the remote vehicles 104B-D. While the lead vehicle 104A is shown in FIG. 1 at one end of the vehicle system 106, the lead vehicle 104A need not be located at either end of the vehicle system 106 or be located ahead of the vehicles 104B-D along a direction of travel of the vehicle system 106.

In operation, the communication devices 102 on the same vehicle system 106 wirelessly communicate with each other within the timed constraints dictated by a messaging cycle. The messaging cycle defines a schedule that dictates when different communication devices 102 are allowed to communicate (e.g., send and/or receive wireless signals). The messaging cycle can prevent multiple, different communication devices 102 onboard different vehicle systems 106 from wirelessly communicating messages at the same time, which can result in messages not being received due to wireless interference between the competing vehicle systems 106.

Figure 2:
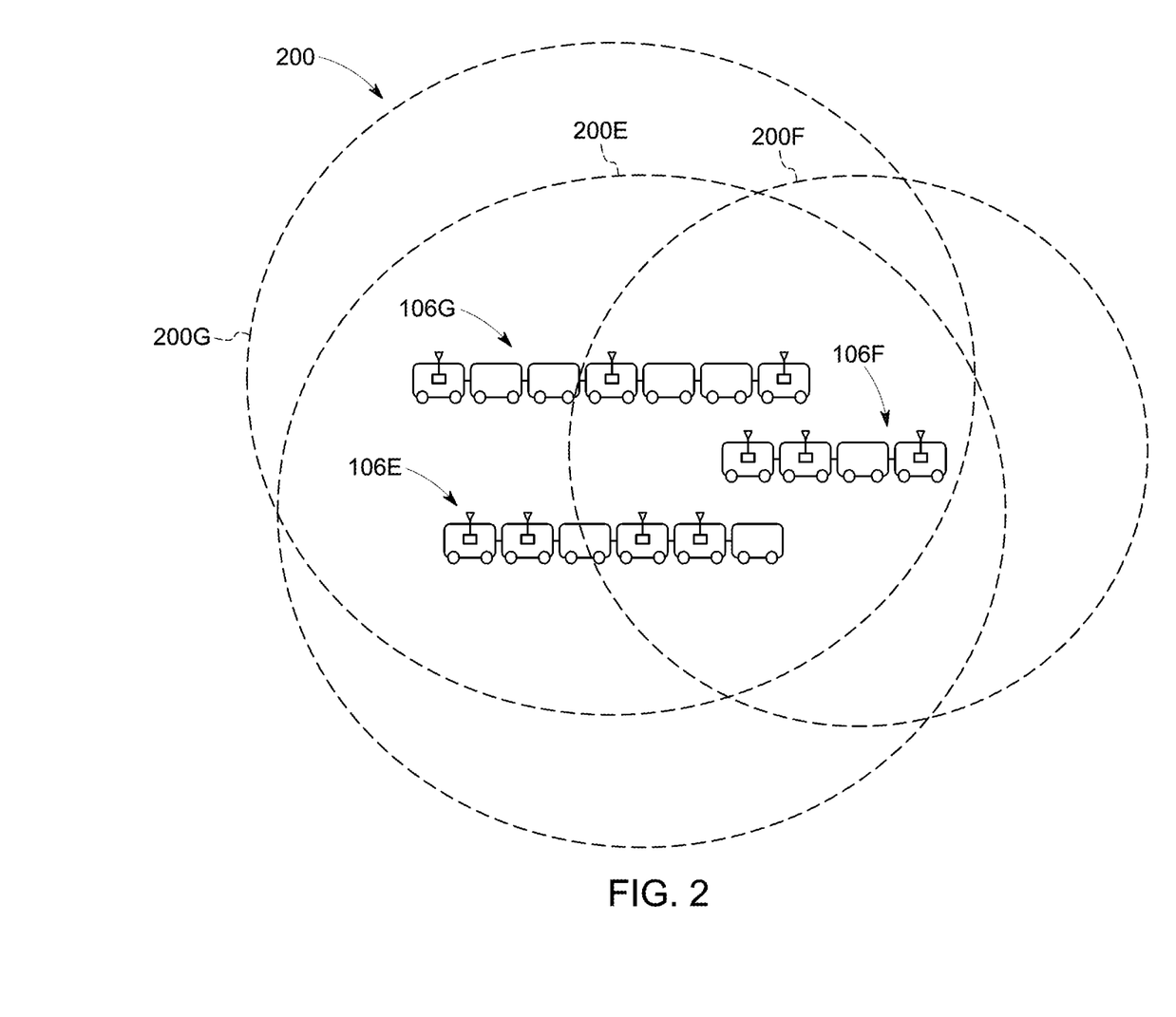
FIG. 2 illustrates one example of several vehicle systems within wireless range of each other.

FIG. 2 illustrates one example of several vehicle systems 106 (e.g., vehicle systems 106E-G) within wireless range of each other. The vehicle system 106E can represent the vehicle system 106 shown in FIG. 1, and the vehicle systems 106F, 106G can represent additional vehicle systems 106 that are separate from the vehicle system 106E but that also include communication systems 100 having wireless communication devices 102 disposed onboard vehicles 104 in the vehicle systems 106F, 106G. Each communication system 100 has a wireless range 200E-G. As shown, the wireless ranges 200E-G of different communication systems 100 overlap each other. If these communication systems 100 use the same channel for sending wireless signals, then the wireless signals communicated between vehicles 104 in one vehicle system 106 can interfere with the wireless signals communicated between vehicles 104 in another vehicle system 106. Because these signals may include directions for changes in how the vehicles 104 in the vehicle systems 106 move (e.g., throttle setting changes and/or brake setting changes), interference with successful communication of the signals can pose a significant threat to safe operation of the vehicle systems 106.

Figure 3:
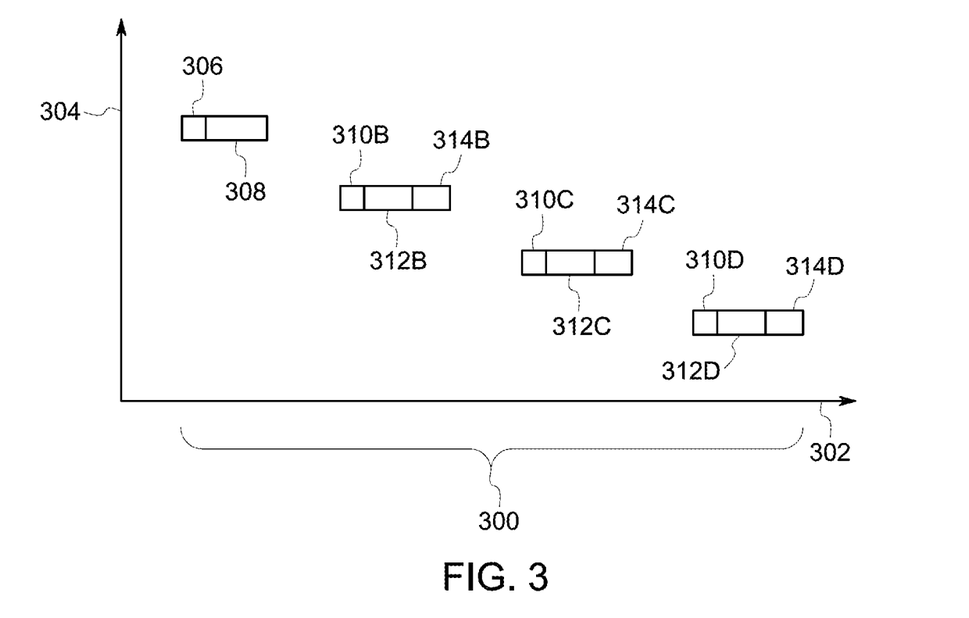
FIG. 3 illustrates one example of a timing diagram for a messaging cycle of one of the vehicle systems shown in FIG. 2.

To prevent or reduce the likelihood of this interference, the communication systems 100 use the defined messaging cycles to restrict when different vehicle systems 106 are permitted to communicate. FIG. 3 illustrates one example of a timing diagram for a messaging cycle 300 of one of the vehicle systems 106. The timing diagram is shown alongside a horizontal axis 302 that is representative of time. A vertical axis 304 represents when the communication devices 102 onboard the different vehicles 104 of the same vehicle system 106 communicate according to the messaging cycle 300.

The communication device 102A onboard the lead vehicle 104A is turned on or otherwise activated during an activation time slot 306 of the messaging cycle 300. During this time period 306, the radio of the communication device 102A may be activated from a state where the radio is not receiving power or is not actively transmitting, broadcasting, or receiving signals. The communication device 102A sends a command message during a subsequent outbound time slot 308 of the messaging cycle 300. During this outbound time slot 308, the communication device 102A of the lead vehicle 104A sends a wireless command signal to the communication devices 102B-D of the remote vehicles 104B-D. This command signal directs the remote vehicles 104B-D to maintain or change one or more operational settings of the vehicles 104B-D, such as maintaining or changing a throttle setting, maintaining or changing a brake setting, or the like.

The communication device 102B onboard the first remote vehicle 104B activates during an activation time slot 310B. The communication device 102B receives the command message from the communication device 102A onboard the lead vehicle 104A and repeats or re-sends the command message as a repeated or relayed message during a subsequent relay time slot 312B. During this time slot 312B, the communication device 102B wirelessly sends the command message received from the communication device 102A onboard the lead vehicle 104A to the communication devices 102C, 102D of one or more other remote vehicles 104C, 104D. The communication device 102B wirelessly sends a reply message to the communication device 102A of the lead vehicle 104A during a subsequent inbound time slot 314B. During this time slot 314B, the communication device 102B wirelessly sends a message to the communication device 102A of the lead vehicle 104A to indicate that the command message was received by the communication device 102B of the remote vehicle 104B.

The remote vehicles 104C, 104D similarly have additional corresponding activation time periods 310C, 310D during which the communication devices 102C, 102D are activated, relay time slots 312C, 312D during which the communication devices 102C, 102D relay the command message originally sent by the communication device 102A (and potentially relayed by one or more other communication devices 102), and reply time slots 314C, 314D during which the communication devices 102C, 102D respond to the communication device 102A to indicate receipt of the command message. The messaging cycle 300 terminates after the last reply time slot 314D of the communication device 102 of the last remote vehicle 104 in the vehicle system 106.

The messages communicated within the message cycle 300 may all be communicated by the communication devices 102 using the same channel (e.g., frequency) and the same modulation scheme (e.g., an analog modulation scheme, such as FSK modulation) to ensure that all messages are successfully received. The various time periods of the messaging cycle 300 are assigned to be non-overlapping time periods to prevent multiple communication devices 102 in the same vehicle system 106 from communicating messages at the same time using the same channel.

The communication devices 102A onboard the lead vehicles 104A in the different vehicle systems 106 may wait for a designated period of time after the messaging cycle 300 of one vehicle system 106 is completed before seizing the channel and sending another command message for another vehicle system 106. For example, the communication device 102A onboard the lead vehicle 104A in the vehicle system 106F may receive messages sent by communication devices 102 onboard another vehicle system 106E during the messaging cycle 300 of that vehicle system 106E on a channel being used by the communication systems 100. The lead communication device 102A onboard the vehicle system 106F may wait a designated period of time after the messaging cycle 300 of the vehicle system 106E completes before sending any command message. This delay can provide the communication devices 102 onboard the vehicle system 106E to complete successful communication of the command message, relay messages, and reply messages. This delay can be referred to as a guard interval.

Figure 4:
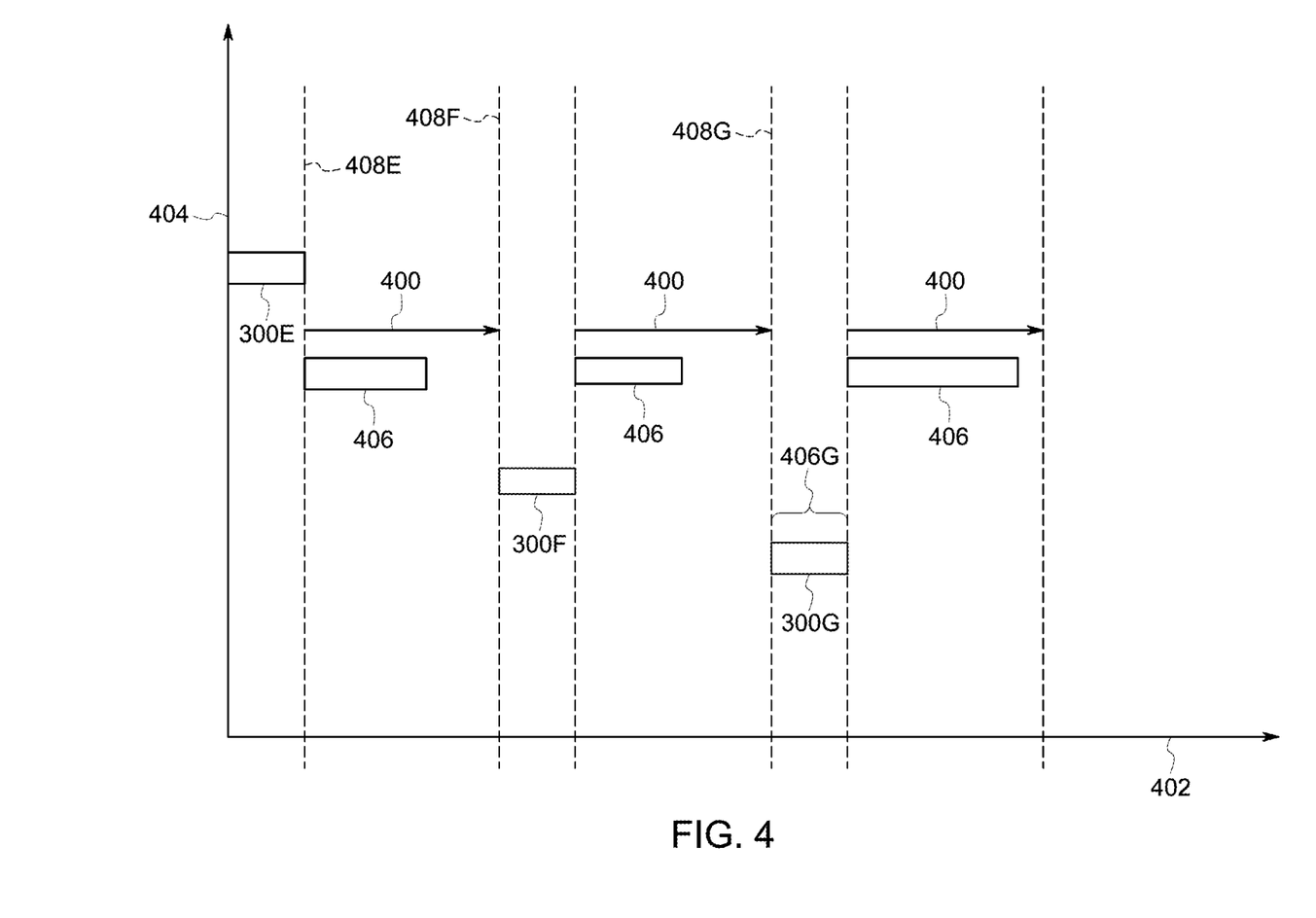
FIG. 4 illustrates one example of a timing diagram having guard intervals.

FIG. 4 illustrates one example of a timing diagram having guard intervals 400. The timing diagram is shown alongside a horizontal axis 402 that is representative of time. A vertical axis 404 represents when different messaging cycles 300 of different vehicle systems 106 occur. The messaging cycle 300E represents the messaging cycle 300 of the communication devices 102 onboard the vehicle system 106E, the messaging cycle 300F represents the messaging cycle 300 of the communication devices 102 onboard the vehicle system 106F, and the messaging cycle 300G represents the messaging cycle 300 of the communication devices 102 onboard the vehicle system 106G. A guard interval 400 occurs after conclusion of each messaging cycle 300. For example, a guard interval 400 may begin at a time 408E after the last remote communication device 102 onboard the vehicle system 106E sends the reply message to the lead communication device 102A of the same vehicle system 106E. Similarly, a guard interval 400 may begin at a time 408F after the last remote communication device 102 onboard the vehicle system 106 sends the reply message to the lead communication device 102A of the same vehicle system 106F. A guard interval 400 may begin at a time 408G after the last remote communication device 102 onboard the vehicle system 106 sends the reply message to the lead communication device 102A of the same vehicle system 106G, and so on.

The command, relay, and reply messages or signals sent during the messaging cycle 300 of a vehicle system 106 can be sent on a designated channel using a first modulation scheme, such as an analog modulation scheme (e.g., FSK modulation). The messages or signals may include identifying information of the communication device 102, vehicle 104, and/or vehicle system 106 from where the message originated. For example, a header or preamble of the messages may include a unique identifier associated with the communication device, vehicle, or vehicle system from which the message originated. Once the lead communication device 102A of a vehicle system 106 sends a command message, the communication system 100 that includes that lead communication device 102A seizes or maintains control of the channel for the entirety of the messaging cycle 300 for that vehicle system 106. This channel exclusivity allows for data communication between the communication devices 102 of that vehicle system 106 to occur exclusively on the channel without interference from communication between other communication devices 102 onboard other vehicle systems 106 using the same channel.

The communication devices 102 onboard the other vehicle systems 106F, 106G also may receive the messages sent from the vehicle system 106E having control of the channel during the messaging cycle 300 of that vehicle system 106E. One or more of these communication devices 102 of the other vehicle systems 106F, 106G can determine that the received message was sent from a communication device 102 of the vehicle system 106E based on the identifying information contained in the command message. The communication devices 102 of the other vehicle systems 106F, 106G may hold off on sending any messages on the channel until the messaging cycle 300 of the vehicle system 106E is complete and after expiration of the guard interval 400 following the messaging cycle 300 of the vehicle system 106E.

Following the end of the guard interval 400, the lead communication device 102A onboard another vehicle system 106 (e.g., the vehicle system 106F) can begin the messaging cycle 300F of that vehicle system 106F at a starting time 408F. For example, the lead communication device 102A of the vehicle system 106F can activate during the activation time slot 306 and can send a command message during the outbound time slot 308 following the starting time 408F. The starting time 408F occurs after the guard interval 400 ends to prevent interference or conflict between messages sent among the communication devices 102 onboard the vehicle system 106E and messages sent among the communication devices 102 onboard the vehicle system 106F. The communication devices 102 onboard other vehicle systems 106 (e.g., the vehicle system 106G) may wait for the guard interval 400 that begins after the messaging cycle 400F of the vehicle system 106F is complete before beginning the messaging cycle 300G of the vehicle system 106G at a starting time 408G.

The communication devices 102 onboard a vehicle system 106 can communicate messages (also referred to as signals) with each other using the same channel but a different modulation scheme during the guard interval 400. During the messaging cycle 300 of a vehicle system 106, the messages or signals are sent using a first modulation scheme, such as an analog modulation scheme). During the guard interval 400 that follows the messaging cycle 300 (e.g., immediately follows or follows after a delay), one or more remote communication devices 102 can send status messages 406 (also referred to as status signals) to the lead communication device 102A using a second modulation scheme that is incompatible with the first modulation scheme. For example, during the messaging cycle 300E, the communication devices 102 of the vehicle system 106E can communicate command, relay, and/or reply signals using analog modulation on a channel while, during the guard interval 400 that follows the messaging cycle 300E, the communication devices 102 of the same vehicle system 106E can communicate status signals using digital modulation on the same channel. Alternatively, during the messaging cycle 300E, the communication devices 102 of the vehicle system 106E can communicate command, relay, and/or reply signals using digital modulation on a channel while, during the guard interval 400 that follows the messaging cycle 300E, the communication devices 102 of the same vehicle system 106E can communicate status signals using analog modulation on the same channel.

The status signals may be communicated only from the communication devices 102 on the remote vehicles 104 to the lead vehicle 106 in the same vehicle system 106, or alternatively may be communicated between any communication devices 102 in the same vehicle system 106, during the guard interval 400. For example, the second modulation scheme may only be used by the communication devices 102 during the guard interval 400, while the first modulation scheme is only used by the communication devices 102 during the messaging cycle 300 that precedes the guard interval 400.

The status signal may be sent using the incompatible second modulation scheme due to the second modulation scheme being able to include a greater amount of data in signals than the first modulation scheme. For example, more data may be communicated at a faster data transmission rate between communication devices 102 using digital modulation on a single frequency channel than using analog modulation on the same single frequency channel. Use of the digital modulation scheme during the guard intervals 400 can significantly increase the amount of data that can be communicated between the communication devices 102 during an otherwise unused time period.

Figure 5:
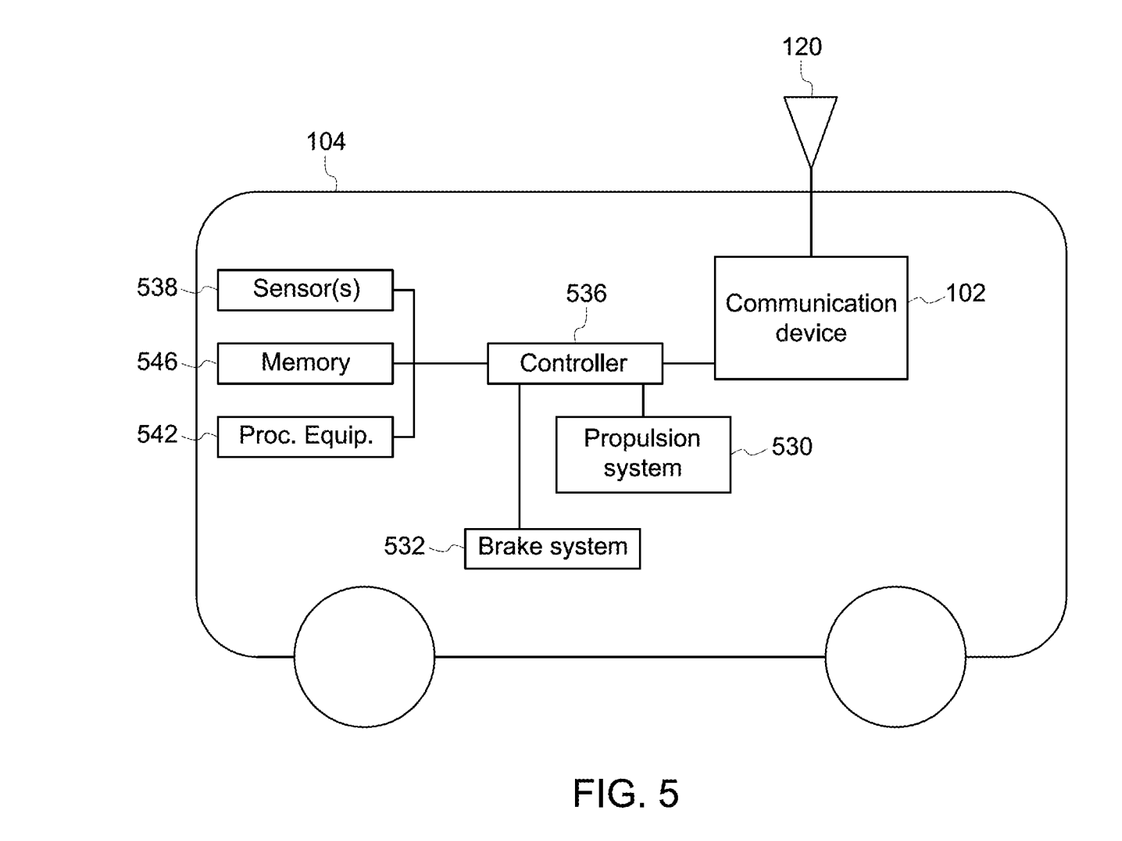
FIG. 5 illustrates one example of one of the vehicles shown in FIG. 1.

In one embodiment, the status signal includes sensor data from one or more sensors onboard a remote vehicle 104 in the vehicle system 106. FIG. 5 illustrates one example of one of the vehicles 104 shown in FIG. 1. The communication device 102 can represent hardware circuitry that includes and/or is connected with one or more processors (e.g., one or more microprocessors, one or more field programmable gate arrays, one or more controllers, and/or one or more integrated circuits) that perform the operations described herein in connection with the communication device 102. The communication device 102 can include transceiving circuitry, such as a radio, transceiver, modem, antenna 120, or the like.

The vehicle 104 also includes a propulsion system 530 and a brake system 532. The propulsion system 530 can include equipment that operates to generate tractive effort to propel the vehicle 104. For example, the propulsion system 530 can include one or more engines, alternators, generators, batteries or other energy storage devices (e.g., capacitors, flywheels, etc.), and/or motors that operate to rotate wheels of the vehicle 104. The brake system 532 can include equipment that operates to generate braking effort to slow or stop movement of the vehicle 104. For example, the brake system 532 can include one or more friction brakes, regenerative brakes (e.g., motors), or the like, that slow or stop rotation of the wheels. Optionally, the brake system 532 may be part of the propulsion system 530. The motor(s) that propel the vehicle 104 for the propulsion system 530 also can use regenerative braking to slow or stop movement of the vehicle 104.

A controller 536 of the vehicle 104 controls operation of the propulsion system 530 and/or the brake system 532 to control movement of the vehicle 104. The controller 536 represents hardware circuitry that includes and/or is connected with one or more processors (e.g., one or more microprocessors, one or more field programmable gate arrays, and/or one or more integrated circuits) that perform the operations of the controller 536. The controller 536 can receive input from an operator of the vehicle 104 (e.g., manual actuation of a throttle, pedal, lever, button, touchscreen, or the like) and can change the tractive effort and/or braking effort created by the propulsion system 530 and/or brake system 532 to implement the operator-directed change in movement of the vehicle 104. The controller 536 optionally can receive command signals via the communication device 102 from the lead vehicle 104 in the same vehicle system 106 and/or from other equipment (onboard or offboard the vehicle system 106). These command signals may direct the controller 536 to change operation of the vehicle 104.

Sensors 538 onboard the vehicle 104 can include cameras, radar systems, antennas, radio frequency identification tag readers, location sensors (e.g., global positioning system receivers), accelerometers, or the like, that measure or otherwise determine characteristics related to operation of the vehicle 104. This sensor data may include too much information to be sent during the messaging cycle 300 using the first modulation scheme (e.g., analog modulation) on the single frequency channel. The faster communication rates and/or greater data bandwidth of using the second modulation scheme (e.g., digital modulation) on the single frequency channel during the guard intervals 400 can allow for increased amounts of sensor data from the sensors 538 to be communicated between the vehicles 104.

The sensor data can be received by processing equipment 542 onboard the vehicle 104 from another vehicle 104. The processing equipment 542 can represent hardware circuitry that includes and/or is connected with one or more processors that use the sensor data to perform one or more functions of the vehicle system 106. For example, the processing equipment 542 can examine the sensor data to determine that a component onboard the vehicle system 106 has failed or is about to fail, that an object is present on the route ahead of the vehicle system 106, that wayside equipment has failed, or the like. Optionally, the sensor data can be stored in a tangible and non-transitory computer-readable storage medium 546 (e.g., "memory" in FIG. 5), such as a computer hard drive, flash drive, optical disc, or the like.

Figure 6:
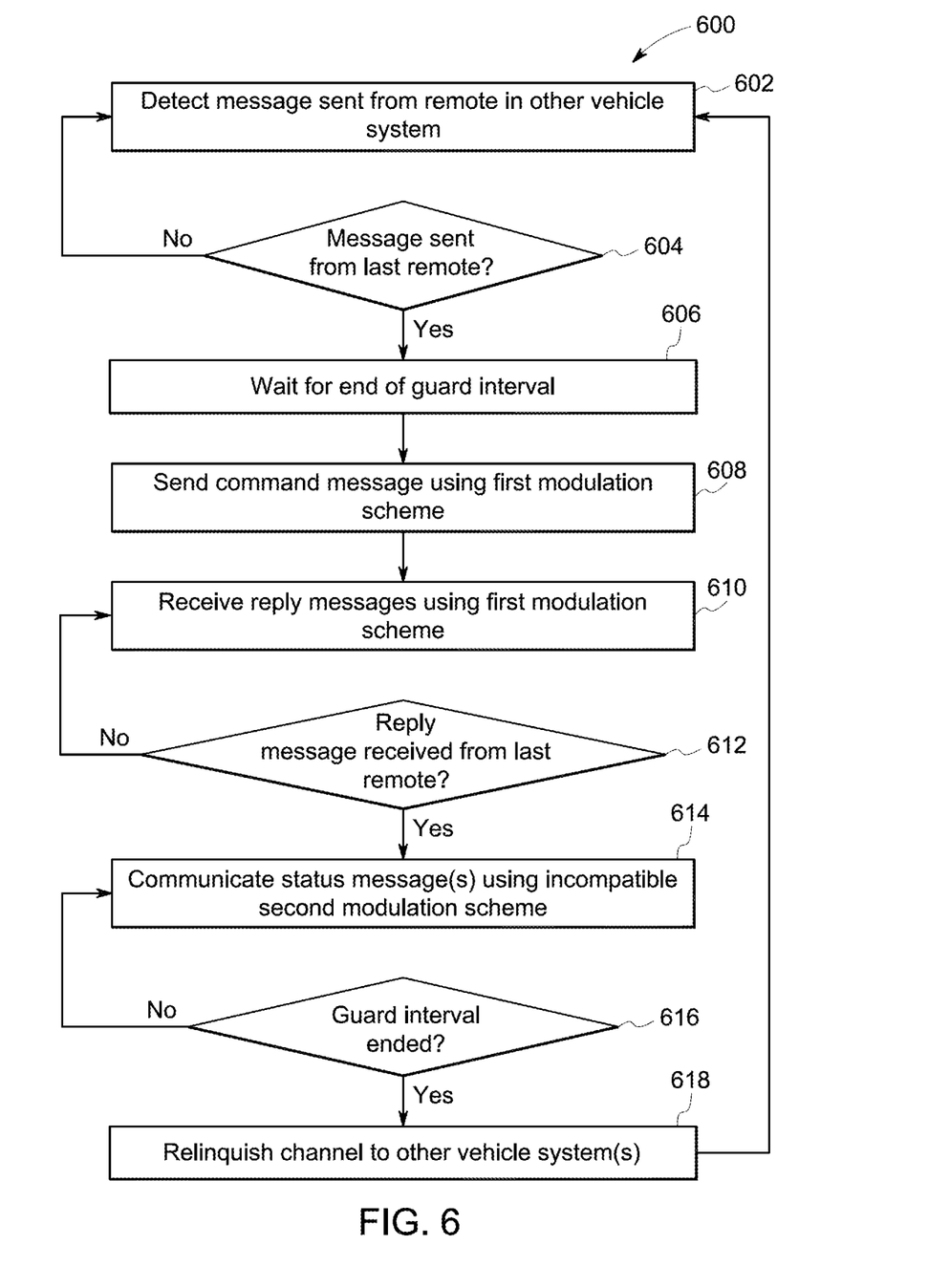
FIG. 6 illustrates a flowchart of one embodiment of a method for communicating within a vehicle system shown in FIG. 1.

FIG. 6 illustrates a flowchart of one embodiment of a method 600 for communicating within a vehicle system 106 shown in FIG. 1. The method 600 can represent the operations performed by one or more of the communication devices 102 onboard a vehicle system 106 shown in FIG. 1. At 602, one or more messages sent from remote vehicles in another vehicle system are received. For example, the lead communication device 102A onboard the vehicle system 106E can receive or detect wireless communication of reply messages or signals sent by the remote vehicles 104 in another vehicle system 106F, 106G that currently has control of the single frequency channel.

At 604, a determination is made as to whether the last remote vehicle in the vehicle system having control over the channel has sent the reply message to the lead vehicle of that vehicle system. For example, the lead communication device 102 of the vehicle system 106E can determine whether the messaging cycle 300 of the vehicle system 106F having control of the channel is complete (e.g., by all remote vehicles 104 in the vehicle system 106F having sent a reply signal to the lead vehicle 104 of that vehicle system 106F). If one or more additional remote vehicles 104 in the vehicle system 106F still need to reply to the command message sent by the lead vehicle 104A in the vehicle system 106F, then the messaging cycle 300 of the vehicle system 106F may not yet be completed. As a result, flow of the method 600 can return toward 602. Otherwise, the messaging cycle 300 of the vehicle system 106F may be complete and the channel may be available for the communication system 100 of the vehicle system 106E. Flow of the method 600 can proceed from 604 toward 606.

At 606, the lead communication device waits for a guard interval to end. The lead communication device 102A of the vehicle system 106E attempting to seize the channel for communication by the vehicle system 106E can wait for the guard interval 400 following the messaging cycle 300 of the other vehicle system 106F to end. This can allow the communication devices 102 of the other vehicle system 106F to communicate using the incompatible modulation scheme on the same channel used for the command, relay, and reply messages.

At 608, a lead communication device of the vehicle system seizes the channel by sending a command message to one or more remote vehicles in the same vehicle system. As described above, the lead communication device 102A of the vehicle system 106E can take control of the single frequency channel by wirelessly communicating a command signal to the remote vehicles 104 of the same vehicle system 106E. This can begin the messaging cycle 300 of the vehicle system 106E. The command signal can be communicated using a first modulation scheme, such as an analog modulation scheme.

At 610, a reply message is received from one or more of the remote vehicles in the vehicle system having control of the channel. For example, the lead communication device 102A of the vehicle system 106E having control of the channel receives reply signals from the communication device 102 onboard one or more of the remote vehicles 104 in the same vehicle system 106E. The reply signals can be communicated using the first modulation scheme, such as an analog modulation scheme.

At 612, a determination is made as to whether the last remote vehicle in the vehicle system having control over the channel has sent the reply message to the lead vehicle of that vehicle system. For example, the lead communication device 102A of the vehicle system 106E can determine whether the messaging cycle 300 of the vehicle system 106E having control of the channel is complete (e.g., by all remote vehicles 104 in the vehicle system 106E having sufficient time to send a reply signal to the lead vehicle 104 of that vehicle system 106E). If one or more additional remote vehicles 104 in the vehicle system 106E still need to reply to the command message sent by the lead vehicle 104A in the vehicle system 106E, then the messaging cycle 300 of the vehicle system 106E may not yet be completed. As a result, flow of the method 600 can return toward 608. Otherwise, the messaging cycle 300 of the vehicle system 106E may be complete. Flow of the method 600 can proceed from 610 toward 614.

At 614, a status message can be communicated between communication devices onboard the vehicle system using the second, incompatible modulation scheme on the same channel. For example, the communication device 102 onboard one or more of the remote vehicles 104 in the vehicle system 106E can send status signals to the lead communication device 102A of the vehicle system 106E during the guard interval 400 and using the second modulation scheme, as described above. Optionally, two or more other communication devices 102 can communicate status signals or other signals using the second modulation scheme.

At 616, a determination is made as to whether the guard interval of the vehicle system has ended. If the guard interval 400 of the vehicle system 106E has not ended, then the communication devices 102 of the vehicle system 106E can continue communicate using the second modulation scheme to communicate signals or messages with each other. As a result, flow of the method 600 can return toward 614. But, if the guard interval 400 of the vehicle system 106E has ended, then the channel may need to be relinquished for one or more other vehicle systems 106F, 106G to use. As a result, flow of the method 600 can proceed toward 618.

At 618, the channel is relinquished to the communication system of another vehicle system. The channel can be relinquished by the lead communication device 102A of the vehicle system 106E not sending any command or other signals using the channel until the channel is available again for use by the vehicle system 106E. Flow of the method 600 can then return toward 602 or may terminate.

In one embodiment, a locomotive communication system includes a lead communication device configured to wirelessly communicate a command message to one or more remote communication devices onboard a rail vehicle system during a messaging cycle. The lead communication device is configured to receive one or more reply messages from the one or more remote communication devices during the messaging cycle in response to communicating the command message. The lead communication device also is configured to receive a status signal from at least one of the remote communication devices during a guard interval that follows completion of the messaging cycle. The lead communication device is configured to communicate the command message and receive the one or more reply messages using a first modulation comprising one of analog modulation or digital modulation. The lead communication device also is configured to receive the status signal using a different, second modulation comprising the other of the analog modulation or the digital modulation. The lead communication device also is configured to communicate the command message and receive the one or more reply messages and the status signal using a designated frequency channel.

Optionally, the analog modulation is frequency shift key modulation and/or the digital modulation is phase shift key modulation. The designated frequency channel may be a single frequency.

The lead communication device can be configured to send the command message during the messaging cycle using frequency shift key modulation and using a communication channel that consists of a single frequency, the lead communication device also can be configured to receive the status signal during the guard interval using phase shift key modulation and using the communication channel that consists of the single frequency, and the lead communication device can be configured to receive the one or more reply messages during the messaging cycle using the communication channel that consists of the single frequency.

The lead communication device can be configured to not send any signal using the first modulation during the guard interval that follows the messaging cycle.

The lead communication device may be disposed onboard a lead locomotive in a rail vehicle system and the one or more remote communication devices may be disposed onboard one or more remote locomotives in the rail vehicle system. The lead communication device can be configured to send one or more of a throttle command or a brake command to the one or more remote locomotives in the command message sent during the messaging cycle, to receive a confirmation that the one or more remote locomotives received the one or more of the throttle command or the brake command in the one or more reply messages during the messaging cycle, and to receive sensor data from at least one of the one or more remote locomotives in the status signal during the guard interval.

In one embodiment, a method includes wirelessly communicating a command message from a lead communication device to one or more remote communication devices onboard a rail vehicle system during a messaging cycle, wirelessly receiving one or more reply messages from the one or more remote communication devices during the messaging cycle in response to communicating the command message, and wirelessly receiving a status signal from at least one of the remote communication devices during a guard interval that follows completion of the messaging cycle. The command message and the reply message are communicated using a first modulation comprising one of analog modulation or digital modulation. The status signal is received using a different, second modulation comprising the other of the analog modulation or the digital modulation. The command message, the reply message, and the status signal are communicated using a designated frequency channel.

Optionally, the analog modulation is frequency shift key modulation and/or the digital modulation is phase shift key modulation. The designated single frequency channel can be a single frequency.

The command message can be communicated during the messaging cycle using frequency shift key modulation and using a communication channel that consists of a single frequency. The status signal can be received during the guard interval using phase shift key modulation and using the communication channel that consists of the single frequency. The reply message can be received during the messaging cycle using the communication channel that consists of the single frequency.

The first modulation may not be used to communicate any message during the guard interval that follows the messaging cycle in one embodiment.

The command message can include one or more of a throttle command or a brake command for one or more remote locomotives in the rail vehicle system, the reply message can include a confirmation that the one or more remote locomotives received the one or more of the throttle command or the brake command, and the status signal can include sensor data from at least one of the one or more remote locomotives.

In one embodiment, a locomotive communication system includes a lead communication device configured to be disposed onboard a lead locomotive of a rail vehicle system. The lead communication device is configured to communicate with one or more remote communication devices according to a defined messaging cycle to control movement of the rail vehicle system. The one or more remote communication devices are disposed onboard one or more remote locomotives in the rail vehicle system. The messaging cycle includes a first time slot for the lead communication device to send a command signal to the one or more remote communication devices using a first modulation scheme on a single frequency channel and one or more subsequent second time slots for the one or more remote communication devices to send a reply signal to the lead communication device using the first modulation scheme on the single frequency channel. The lead communication device is configured to receive a status signal from at least one of the remote communication devices using a second modulation scheme on the single frequency channel. The first modulation scheme and the second modulation scheme are incompatible with each other.

Optionally, the lead communication device is configured to receive the status signal only during a guard interval that follows the messaging cycle and during which no other vehicle system is able to use the single frequency channel for communication.

The first modulation scheme can be an analog modulation scheme and the second modulation scheme can be a digital modulation scheme.

The status signal can include sensor data. The command signal can direct a change in one or more of a throttle setting or a brake setting of the one or more remote locomotives.

In an embodiment, a system includes a lead communication device configured to be disposed onboard a vehicle system. The lead communication device is configured to wirelessly communicate a command message to one or more remote communication devices onboard the vehicle system during a messaging cycle. The lead communication device is configured to wirelessly receive one or more reply messages from the one or more remote communication devices during the messaging cycle in response to communicating the command message. The lead communication device is configured to wirelessly receive a status signal from at least one of the remote communication devices during a guard interval that follows completion of the messaging cycle. The command message and the reply message are communicated using a first modulation comprising one of analog modulation or digital modulation. The status signal is received using a different, second modulation comprising the other of the analog modulation or the digital modulation. The command message, the reply message, and the status signal are communicated using a designated frequency channel.

For example, in an embodiment of the system described in the preceding section, the analog modulation may be frequency shift key modulation, the digital modulation may be phase shift key modulation, and/or the designated single frequency channel may be a single frequency. In another embodiment, alternatively or additionally, the lead communication device is configured to wirelessly communicate the command message during the messaging cycle using frequency shift key modulation and using a communication channel that consists of a single frequency, to receive the status signal during the guard interval using phase shift key modulation and using the communication channel that consists of the single frequency, and to receive the reply message during the messaging cycle using the communication channel that consists of the single frequency. Additionally or alternatively, the first modulation is not used to communicate any message during the guard interval that follows the messaging cycle.

In an embodiment of the system described in the preceding two sections, the command message may include one or more of a throttle command or a brake command for one or more remote vehicles in the vehicle system, the reply message may include a confirmation that the one or more remote vehicles received the one or more of the throttle command or the brake command, and/or the status signal may include sensor data from at least one of the one or more remote vehicles.

As used herein, an element or step recited in the singular and proceeded with the word "a" or "an" does not exclude plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle communication system comprising:
a lead communication device configured to wirelessly communicate a command message to one or more remote communication devices onboard a vehicle system during a messaging cycle, the lead communication device configured to receive one or more reply messages from the one or more remote communication devices during the messaging cycle in response to communicating the command message, the lead communication device also configured to receive a status signal from at least one of the remote communication devices during a guard interval that follows completion of the messaging cycle,
wherein the lead communication device is configured to communicate the command message and receive the one or more reply messages using a first modulation,
wherein the lead communication device is configured to receive the status signal using a different, second modulation,
wherein the lead communication device is configured to communicate the command message and receive the one or more reply messages and the status signal using a designated frequency channel, and
wherein the lead communication device is configured to send one or more of a throttle command or a brake command to one or more remote vehicles in the command message sent during the messaging cycle and the lead communication device is configured to receive a confirmation that the one or more remote vehicles received the one or more of the throttle command or the brake command in the one or more reply messages during the messaging cycle.

2. The vehicle communication system of claim 1, wherein at least one of the one or more remote communication devices is configured to relay the command message from the lead communication device as a relayed message during a subsequent relay time slot.

3. The vehicle communication system of claim 2, wherein the lead communication device of a lead vehicle is configured to receive the one or more reply messages from the one or more remote communication devices to indicate that the command message was received by the one or more remote communication devices of the one or more remote vehicles during the subsequent relay time slot.

4. The vehicle communication system of claim 1, wherein the lead communication device is configured to receive the status signal from the one or more remote communication devices using the second modulation that is incompatible with the first modulation during the guard interval that follows the messaging cycle.

5. The vehicle communication system of claim 4, wherein the lead communication device is configured to receive the status signal using the second modulation to include more data than is available to the one or more reply messages sent using the first modulation.

6. The vehicle communication system of claim 1, wherein the lead communication device is configured to receive the status signal from the one or more remote communication devices on the one or more remote vehicles in the same vehicle system during the guard interval, during which no other vehicle system is able to use the designated frequency channel.

7. The vehicle communication system of claim 1, wherein the lead communication device is configured to communicate the command message outside of the guard interval that follows the messaging cycle.

8. The vehicle communication system of claim 1, wherein the lead communication device is configured to be activated during an activation time slot of the messaging cycle.

9. A method comprising:
wirelessly communicating a command message from a lead communication device to one or more remote communication devices onboard a vehicle system during a messaging cycle;
wirelessly receiving one or more reply messages from the one or more remote communication devices during the messaging cycle in response to communicating the command message; and
wirelessly receiving a status signal from at least one of the remote communication devices during a guard interval that follows completion of the messaging cycle,
wherein the command message and the one or more reply messages are communicated using a first modulation,
wherein the status signal is received using a different, second modulation,
wherein the command message, the one or more reply messages, and the status signal are communicated using a designated frequency channel, and
wherein the command message includes one or more of a throttle command or a brake command for one or more remote vehicles in the vehicle system, the one or more reply messages includes a confirmation that the one or more remote communication devices received the one or more of the throttle command or the brake command.

10. The method of claim 9, further comprising:
relaying the command message from the lead communication device using at least one of the one or more remote communication devices as a relayed message during a subsequent relay time slot.

11. The method of claim 10, wherein the one or more reply messages are received by the lead communication device of a lead vehicle during the subsequent relay time slot to indicate that the command message was received by the one or more remote communication devices of the one or more remote vehicles.

12. The method of claim 9, wherein the status signals are received from the one or more remote communication devices using the second modulation that is incompatible with the first modulation during the guard interval that follows the messaging cycle.

13. The method of claim 12, wherein the status signal sent using the second modulation includes more data than the command message and the one or more reply messages sent using the first modulation.

14. The method of claim 9, wherein the status signal is received only during the guard interval, during which no other vehicle system is able to use the designated frequency channel.

15. The method of claim 9, wherein the command message is communicated outside of the guard interval.

16. A vehicle communication system comprising:
a lead communication device configured to be disposed onboard a lead vehicle of a vehicle system;
wherein the lead communication device is configured to communicate with one or more remote communication devices according to a defined messaging cycle to control movement of the vehicle system, the one or more remote communication devices disposed onboard one or more remote vehicles in the vehicle system, the messaging cycle including a first time slot for the lead communication device to send a command signal to the one or more remote communication devices using a first modulation scheme on a single frequency channel and one or more subsequent second time slots for the one or more remote communication devices to send a reply signal to the lead communication device using the first modulation scheme on the single frequency channel,
wherein the lead communication device is configured to receive a status signal from at least one of the remote communication devices using a second modulation scheme on the single frequency channel, and
wherein the first modulation scheme and the second modulation scheme are incompatible with each other.

17. The vehicle communication system of claim 16, wherein the lead communication device is configured to relay the command signal using at least one of the one or more remote communication devices as a relayed message during a subsequent relay time slot, and wherein the lead communication device of the lead vehicle is configured to receive the reply signal from the one or more remote communication devices to indicate that the command signal was received by the one or more remote communication devices of the one or more remote vehicles during the subsequent relay time slot.

18. The vehicle communication system of claim 16, wherein the lead vehicle is configured to receive the status signal using the second modulation scheme to include more data than is available to the reply signal sent using the first modulation scheme.

19. The vehicle communication system of claim 16, wherein the lead vehicle is configured to receive the status signal from the remote communication devices on the one or more remote vehicles in the same vehicle system only during a guard interval, during which no other vehicle system is able to use the single frequency channel.

20. The vehicle communication system of claim 16, wherein the lead communication device is configured to communicate the command signal outside of a guard interval.

* * * * *